US008514099B2

(12) United States Patent
Seder et al.

(10) Patent No.: US 8,514,099 B2
(45) Date of Patent: Aug. 20, 2013

(54) VEHICLE THREAT IDENTIFICATION ON FULL WINDSHIELD HEAD-UP DISPLAY

(75) Inventors: Thomas A. Seder, Northville, MI (US); Joseph F. Szczerba, Grand Blanc, MI (US); Dehua Cui, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 410 days.

(21) Appl. No.: 12/903,267

(22) Filed: Oct. 13, 2010

(65) Prior Publication Data
US 2012/0093357 A1    Apr. 19, 2012

(51) Int. Cl.
*G08B 21/00*    (2006.01)

(52) U.S. Cl.
USPC ............ 340/901; 340/903; 340/438; 701/301

(58) Field of Classification Search
USPC .............. 340/901, 902, 903, 905, 425.5, 435, 340/436, 438, 573.1; 701/300, 301
See application file for complete search history.

(56) References Cited

U.S. PATENT DOCUMENTS

| | | | |
|---|---|---|---|
| 6,986,581 B2 | 1/2006 | Sun et al. | |
| 7,090,355 B2 | 8/2006 | Liu et al. | |
| 7,182,467 B2 | 2/2007 | Liu et al. | |
| 7,213,923 B2 | 5/2007 | Liu et al. | |
| 7,460,951 B2 | 12/2008 | Altan et al. | |
| 7,796,056 B2 * | 9/2010 | Fein et al. ............... | 340/995.24 |
| 2008/0158510 A1 | 7/2008 | Tant et al. | |
| 2009/0268946 A1 | 10/2009 | Zhang et al. | |
| 2010/0253489 A1 | 10/2010 | Cui et al. | |
| 2010/0253492 A1 | 10/2010 | Seder et al. | |
| 2010/0253493 A1 | 10/2010 | Szczerba et al. | |
| 2010/0253526 A1 | 10/2010 | Szczerba et al. | |
| 2010/0253539 A1 | 10/2010 | Seder et al. | |
| 2010/0253540 A1 | 10/2010 | Seder et al. | |
| 2010/0253541 A1 | 10/2010 | Seder et al. | |
| 2010/0253542 A1 | 10/2010 | Seder et al. | |
| 2010/0253543 A1 | 10/2010 | Szczerba et al. | |
| 2010/0253593 A1 | 10/2010 | Seder et al. | |
| 2010/0253594 A1 | 10/2010 | Szczerba et al. | |
| 2010/0253595 A1 | 10/2010 | Szczerba et al. | |
| 2010/0253596 A1 | 10/2010 | Szczerba et al. | |
| 2010/0253597 A1 | 10/2010 | Seder et al. | |
| 2010/0253598 A1 | 10/2010 | Szczerba et al. | |
| 2010/0253599 A1 | 10/2010 | Szczerba et al. | |
| 2010/0253600 A1 | 10/2010 | Seder et al. | |
| 2010/0253601 A1 | 10/2010 | Seder et al. | |
| 2010/0253602 A1 | 10/2010 | Szczerba et al. | |
| 2010/0253688 A1 | 10/2010 | Cui et al. | |
| 2010/0253918 A1 | 10/2010 | Seder et al. | |
| 2010/0254019 A1 | 10/2010 | Cui et al. | |

OTHER PUBLICATIONS

U.S. Appl. No. 12/467,340, Szczerba et al.
U.S. Appl. No. 12/467,350, Seder et al.

(Continued)

*Primary Examiner* — Jeffery Hofsass

(57) ABSTRACT

A method to dynamically register a graphic identifying a potentially threatening vehicle onto a driving scene of a vehicle utilizing a substantially transparent windscreen head up display includes monitoring a vehicular environment, identifying the potentially threatening vehicle based on the monitored vehicular environment, determining the graphic identifying the potentially threatening vehicle, dynamically registering a location of the graphic upon the substantially transparent windscreen head up display corresponding to the driving scene of the vehicle, and displaying the graphic upon the substantially transparent windscreen head up display, wherein the substantially transparent windscreen head up display includes one of light emitting particles or microstructures over a predefined region of the windscreen permitting luminescent display while permitting vision therethrough.

20 Claims, 3 Drawing Sheets

(56) References Cited

OTHER PUBLICATIONS

U.S. Appl. No. 12/900,566, Szczerba et al.
U.S. Appl. No. 12/900,539, Szczerba et al.
U.S. Appl. No. 12/980,503, Szczerba et al.
U.S. Appl. No. 12/979,432, Szczerba et al.
U.S. Appl. No. 12/980,522, Szczerba et al.
U.S. Appl. No. 12/980,612, Szczerba et al.
U.S. Appl. No. 12/981,206, Szczerba et al.
U.S. Appl. No. 12/981,602, Szczerba et al.
U.S. Appl. No. 12/982,478, Szczerba et al.

* cited by examiner

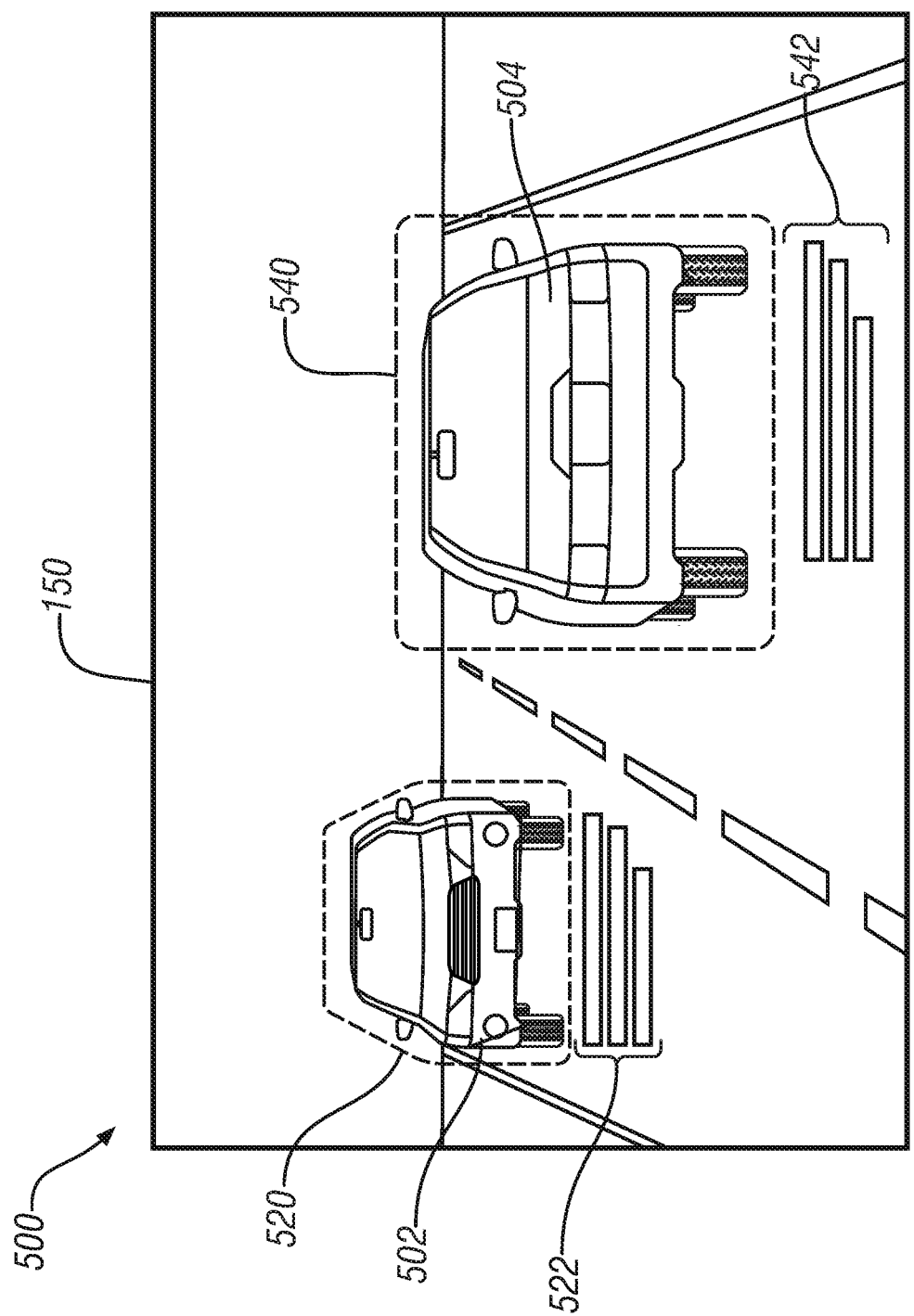

US 8,514,099 B2

VEHICLE THREAT IDENTIFICATION ON FULL WINDSHIELD HEAD-UP DISPLAY

TECHNICAL FIELD

This disclosure is related to graphical imaging identification of potentially threatening vehicles upon a windscreen in a motor vehicle.

BACKGROUND

The statements in this section merely provide background information related to the present disclosure and may not constitute prior art.

Identifying motorists that possess careless, reckless or otherwise poor driving characteristics that are potential threats promotes safety to an operator of a vehicle traveling along a roadway. The earlier the operator of the vehicle can identify a potentially threatening vehicle, the earlier the operator is able to take precautions to stay away from potentially threatening vehicles.

An operator of a vehicle may be able to identify driving characteristics that are potentially threatening. However, this requires the driver to personally analyze the driving conditions of other motorists. Because the operator is focusing on driving, the operator may not notice other motorists that pose a threat. Often, only obvious driving characteristics that amount to reckless driving can be observed by the operator. In such scenarios, it can be too late for the operator to take the necessary precautions and avoid the reckless motorist that is a threat to the operator's safety.

Head-up displays project light upon a screen and the light is converted into a viewable display upon the screen. Head-up displays are known to present information to the operator of the vehicle in an effective manner by reducing strain upon the operator while allowing the operator to remain focused on driving.

SUMMARY

A method to dynamically register a graphic identifying a potentially threatening vehicle onto a driving scene of a vehicle utilizing a substantially transparent windscreen head up display includes monitoring a vehicular environment, identifying the potentially threatening vehicle based on the monitored vehicular environment, determining the graphic identifying the potentially threatening vehicle, dynamically registering a location of the graphic upon the substantially transparent windscreen head up display corresponding to the driving scene of the vehicle, and displaying the graphic upon the substantially transparent windscreen head up display, wherein the substantially transparent windscreen head up display includes one of light emitting particles or microstructures over a predefined region of the windscreen permitting luminescent display while permitting vision therethrough.

BRIEF DESCRIPTION OF THE DRAWINGS

One or more embodiments will now be described, by way of example, with reference to the accompanying drawings, in which:

FIG. 5 is an example of a driving scene 500 including graphics dynamically registered upon a substantially transparent windscreen head-up display 150 of a vehicle, in accordance with the present disclosure.

DETAILED DESCRIPTION

Figure 1:
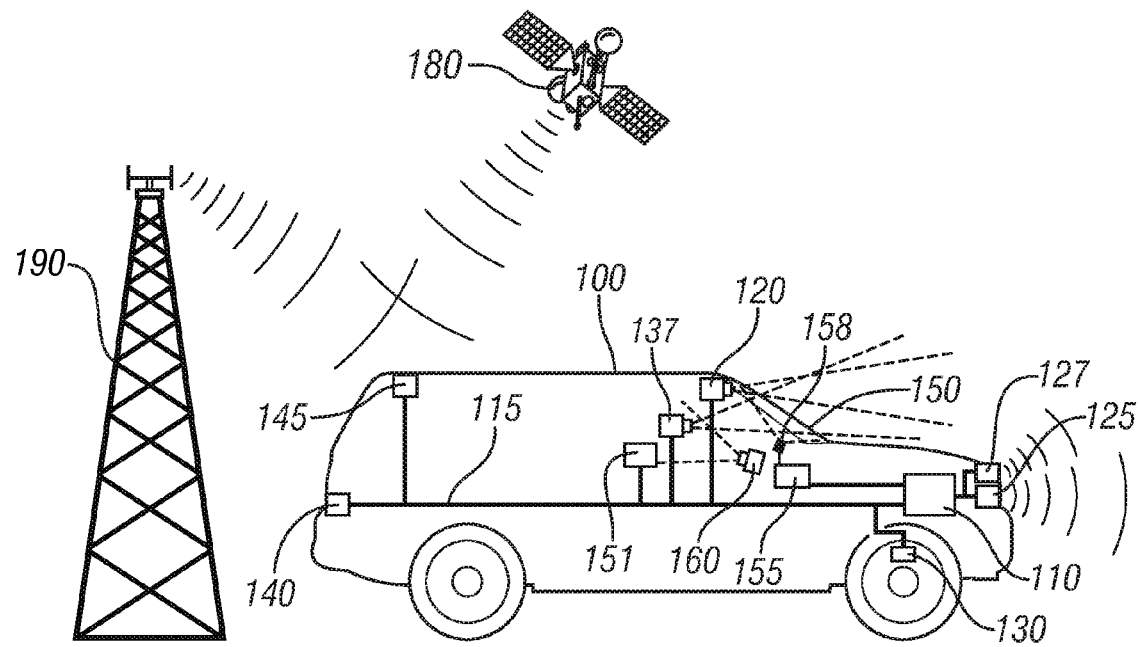
FIG. 1 depicts an exemplary vehicle equipped with an EVS system, in accordance with the present disclosure.

Referring now to the drawings, wherein the showings are for the purpose of illustrating certain exemplary embodiments only and not for the purpose of limiting the same, a method utilizing an enhanced vision system (EVS) to represent graphical images upon a windscreen of a vehicle identifying potentially threatening vehicles is disclosed. The graphical images originate from sensor and/or data inputs identifying the potentially threatening vehicles and include processing of the inputs in order to convey the identification of the potentially threatening vehicles to the operator or occupants of the vehicle. Graphical images to be displayed upon the windscreen are dynamically registered to a location upon the windscreen corresponding to a driving scene of the vehicle, such that an intended operator or occupant of the vehicle may view the other vehicles and the registered graphical image identifying the potentially threatening vehicles as a single discernable input. Likewise, graphical images describing the potential threats of the potentially threatening vehicles can by dynamically registered in the same manner as the registered graphical image identifying the potentially threatening vehicles.

FIG. 1 depicts an exemplary vehicle equipped with an EVS system, in accordance with the present disclosure. An exemplary EVS system manager is disclosed in co-pending U.S. application Ser. No. 12/417,077, entitled ENHANCED VISION SYSTEM FULL-WINDSHIELD HUD, filed on Apr. 2, 2009, and is hereby incorporated by reference. Vehicle 100 includes an EVS system manager 110; vehicle sensor systems, including camera system 120, lidar system 127, infrared (IR) imaging device 137 and radar system 125; vehicle operation sensors, including vehicle speed sensor 130; information systems, including GPS device 140 and wireless communication system 145; head-up display (HUD) 150; human machine interface (HMI) 151; EVS graphics system 155; graphics projection system 158; and occupant eye location sensing system 160. The EVS system manager 110 includes a programmable processor and programming to monitor various inputs and identify potentially threatening vehicles to the vehicle 100 to display upon the HUD. The EVS system manager 110 can communication directly with various systems and components, or the EVS system manager 110 can alternatively or additionally communicate over a LAN/CAN system 115. The EVS system manager 110 utilizes information regarding the operational environment of the vehicle 100 derived from a number of inputs. Camera system 120 includes a camera or image capturing device taking periodic or sequential images representing a view from the vehicle. The camera or image capturing device of the camera system 120 includes a 360 degree of rotation camera representing a bird's eye view from the vehicle 100. Lidar system 127 includes a device known in the art utilizing scattered light to find range and/or other information of other vehicles located near the vehicle. IR imaging device 137 includes a device known in the art utilizing thermal imaging cameras to detect radiation in the infrared range of the electromagnetic spectrum and produce images of that radiation corresponding to other vehicles. Radar system 125 includes a device known in the art utilizing electromagnetic radiation to detect other vehicles or objects located near the vehicle. A number of known in-vehicle sensors are widely used within a vehicle to monitor vehicle speed, engine speed, wheel slip, and other parameters descriptive of the operation of the vehicle. Exemplary vehicle speed sensor 130 is depicted to represent such an in-vehicle sensor describing vehicle operation, but the disclosure intends to include any such sensors for use by the EVS. GPS device 140 and wireless communication system 145 are devices known in the art for communicating with resources outside of the vehicle, for example, satellite system 180 and cellular communications tower 190. GPS device 140 may be utilized in conjunction with a 3D map database including detailed information relating to a global coordinate received by the GPS device 140 regarding the current location of the vehicle. Information from the vehicle sensor systems and the vehicle operator sensors can be utilized by the EVS system manager 110 to monitor the current orientation of the vehicle. HUD 150 includes a windscreen equipped with features capable of displaying an image projected thereupon while remaining transparent or substantially transparent such that occupants of the vehicle can clearly observe outside of the vehicle through the windscreen. One will appreciate that while HUD 150 includes the windscreen in the front of the vehicle, other surfaces within the vehicle could be used for projection, including side windows and a rear window. Additionally, the view on the front windscreen could be continued upon the front vehicle "A-pillars" and onto the side windows as a continuous image. HMI 151 includes a computing device where the operator of the vehicle can input commands to control various systems of the vehicle in signal communication with the HMI 151 and receive desirable information. For instance, utilizing the HMI 151, the operator can input requests to other vehicles (i.e., vehicle-to-vehicle communication) to help identify potentially threatening vehicles forward along a roadway. EVS graphics engine 155 includes display software or programming translating requests to display information from the EVS system manager 110 in graphical representations identifying and describing the information. The EVS graphics engine 155 includes programming to compensate for the curved and tilted surface of the windscreen and any other surfaces onto which graphics are to be projected. EVS graphics engine 155 controls graphics projection system 158 including a laser or projector device producing an excitation light to project the graphical representations. Occupant eye location sensing system 160 includes sensors known in the art to approximate a location of the head of an occupant and further the orientation or gaze location of the eyes of the occupant. Based upon the output of the occupant eye location sensing system 160, the current orientation of the vehicle 100 and input data tracking location information regarding the environment around the vehicle (e.g., identified potentially threatening vehicles), EVS system manager 110 can accurately dynamically register the graphical representations to the HUD such the occupant sees the images overlaid with visual images through the windscreen.

The EVS described above includes eye sensing and head sensing devices allowing estimation of eye location, allowing dynamic registration of images upon the HUD such that the images correspond to a view of the operator. However, it will be appreciated that estimation of head and eye location can be achieved through a number of methods. For example, in a process similar to adjusting rearview mirrors, an operator can use a calibration routine upon entering a vehicle to align graphics to a detected object. In another embodiment, seat position longitudinally in the vehicle can be used to estimate a position of the driver's head. In another embodiment, manual adjustment of a rearview mirror or mirrors can be used to estimate location of an operator's eyes. It will be appreciated that a combination of methods, for example, seat position and mirror adjustment angle, can be utilized to estimate operator head location with improved accuracy. Many methods to accomplish accurate registration of graphics upon the HUD are contemplated, and the disclosure is not intended to be limited to the particular embodiments described herein.

An exemplary EVS includes: a wide field of view, full windscreen HUD, a substantially transparent screen including functionality to display graphical images projected thereupon; a HUD image engine including a laser or lasers capable of projecting images upon the windscreen; input sources deriving data concerning the operating environment of the vehicle; and an EVS system manager including programming to monitor inputs from the input devices, process the inputs and determine critical information relative to the operating environment, and create requests for graphical images to be created by the HUD image engine. However, it will be appreciated that this exemplary EVS is only one of a wide number of configurations that an EVS can take. For example, a vision or camera system is useful to various EVS applications that will be discussed. However, it will be appreciated that an exemplary EVS system can operate without a vision system, for example, providing information available from only a GPS device, 3D map database, and in-vehicle sensors. In the alternative, it will be appreciated that an exemplary EVS system can operate without access to a GPS device or wireless network, instead utilizing inputs only from a vision system and radar system. Many various configurations are possible with the disclosed systems and methods, and the disclosure is not intended to limited to the exemplary embodiments described herein.

Figure 2:
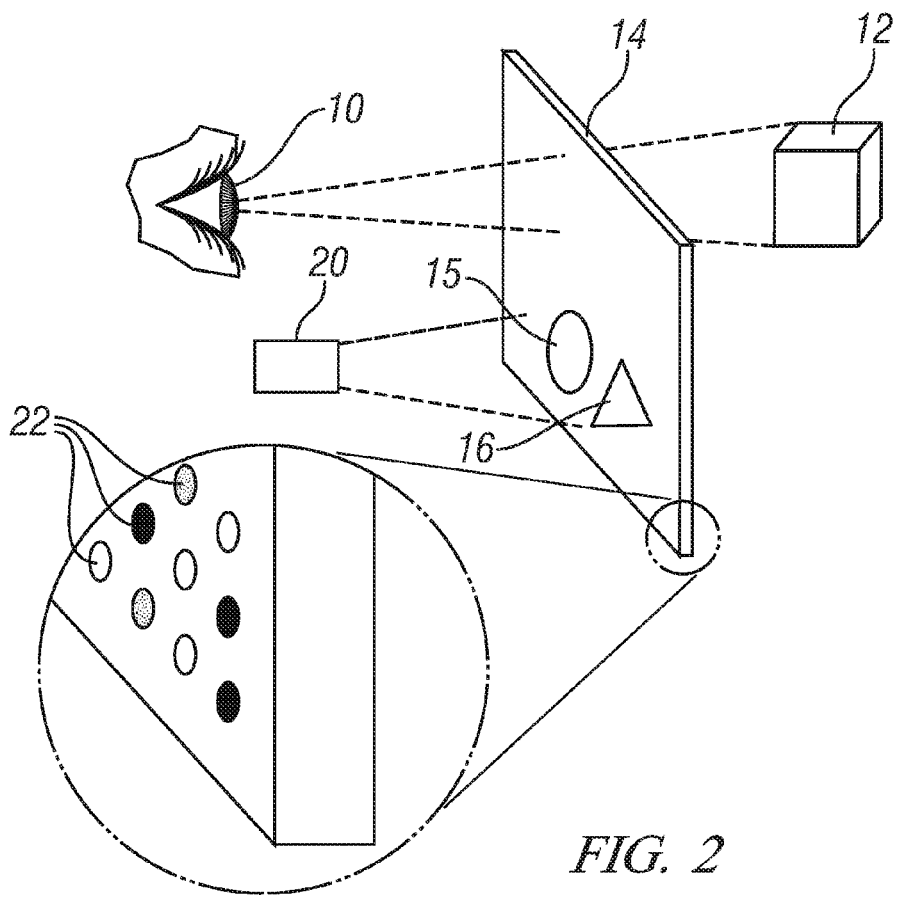
FIG. 2 is an examplary diagram of a substantially transparent display, in accordance with the present disclosure.

In order to function as a medium through which relevant features are observable while serving as a display device upon which the graphical images may be displayed, the windscreen of the vehicle must be both transparent and capable of displaying images projected by an excitation light source. FIG. 2 is an exemplary diagram of a substantially transparent display, in accordance with the present disclosure. Viewer 10 is able to see an arbitrary object (e.g. cube 12) through substrate 14. Substrate 14 may be transparent or substantially transparent. While viewer 10 sees arbitrary object 12 through substrate 14, the viewer can also see images (e.g. circle 15 and triangle 16) that are created at substrate 14. Substrate 14 may be part of a vehicle windshield, a building window, a glass substrate, a plastic substrate, a polymer substrate, or other transparent (or substantially transparent) medium that would be appreciated by one of ordinary skill in the art. Other substrates may complement substrate 14 to provide for tinting, substrate protection, light filtering (e.g. filtering external ultraviolet light), and other functions.

FIG. 2 depicts illumination of transparent displays illuminated with excitation light (e.g. ultraviolet light or infrared light) from light sources (e.g. a projector or laser, depicted by device 20, in accordance with embodiments). Substrate 14 may receive excitation light from a light source (e.g. projector or laser 20). The received excitation light may be absorbed by light emitting material at substrate 14. When the light emitting material receives the excitation light, the light emitting material may emit visible light. Accordingly, images (e.g. circle 15 and triangle 16) may be created at substrate 14 by selectively illuminating substrate 14 with excitation light.

In embodiments illustrated in FIG. 2, the excitation light is output by device 20 including a projector. The projector may be a digital projector. In embodiments, the projector is a micro-mirror array (MMA) projector (e.g. a digital light processing (DLP) projector). A MMA projector that outputs ultraviolet light may be similar to a MMA projector that outputs visible light, except that the color wheel has light filters that are tailored to the ultraviolet light spectrum. In other embodiments, the projector is a liquid crystal display (LCD) projector. In embodiments, the projector may be a liquid crystal on silicon (LCOS) projector. In embodiments, the projector may be an analog projector (e.g. a slide film projector or a movie film projector). One of ordinary skill in the art would appreciate other types of projectors may be used to project ultraviolet light on substrate 14.

Returning to the exemplary embodiment illustrated in FIG. 2, an excitation light is output from device 20, in this example, a laser. The intensity and/or movement of a laser beam output from device 20 may be modulated to create an image in substrate 14. In down-conversion embodiments, the output from the laser may be ultraviolet light. In up-conversion embodiments, the output from the laser may be infrared light.

FIG. 2 is an exemplary diagram of light emitting material (e.g. light emitting particles 22) dispersed in a substantially transparent substrate. When excitation light is absorbed by the light emitting particles 22, the light emitting particles emit visible light. Accordingly, in down-conversion embodiments, when ultraviolet light is absorbed by light emitting particles 22, visible light is emitted from the light emitting particles. Likewise, in up-conversion embodiments, when infrared light is absorbed by light emitting particles 22, visible light is emitted from the light emitting particles.

FIG. 2 illustrates light emitting material, including light emitting particles 22, dispersed in a substantially transparent substrate, according to embodiments of the disclosure. These light emitting particles 22 can be substantially similar particles throughout, or, as depicted in FIG. 2, the particles can vary in composition. When excitation light is absorbed by the light emitting particles 22, the particles emit visible light. Accordingly, in down-conversion embodiments, when ultraviolet light is absorbed by light emitting materials, visible light is emitted from the light emitting materials. Likewise, in up-conversion embodiments, when infrared light is absorbed by light emitting materials, visible light is emitted from the light emitting materials. In embodiments, each of light emitting materials may be a different type of light emitting material, which emits a different range of wavelengths of visible light in response to a different range of wavelengths of excitation light (e.g. ultraviolet or infrared light).

Light emitting particles 22 may be dispersed throughout substrate 14. In the alternative, as depicted in FIG. 2, the particles may be disposed on a surface of substrate 14. Light emitting particles 22 may be integrated into substrate 14 by being coated on substrate 14. Light emitting material may be fluorescent material, which emits visible light in response to absorption of electromagnetic radiation (e.g. visible light, ultraviolet light, or infrared light) that is a different wavelength than the emitted visible light. The size of the particles may be smaller than the wavelength of visible light, which may reduce or eliminate visible light scattering by the particles. Examples of particles that are smaller than the wavelength of visible light are nanoparticles or molecules. According to embodiments, each of the light emitting particles has a diameter that is less than about 400 nanometers. According to embodiments, each of the light emitting particles has a diameter that is less than about 300 nanometers. According to embodiments, each of the light emitting particles has a diameter that is less than about 200 nanometers. According to embodiments, each of the light emitting particles has a diameter that is less than about 100 nanometers. According to other embodiments, each of the light emitting particles has a diameter that is less than about 50 nanometers. The light emitting particles may be individual molecules.

Other methods can be applied for integrating light emitting materials on a surface of substrate 14. Similar to embodiments illustrated in example FIG. 2, each of the light emitting materials may be a different type of light emitting material, which emit a different range of wavelengths of visible light in response to a different range of wavelengths of excitation light (e.g. ultraviolet or infrared light). Light emitting material may be fluorescent material, which emits visible light in response to absorption of electromagnetic radiation (e.g. visible light, ultraviolet light, or infrared light) that is a different wavelength than the emitted visible light. Light emitting material may include light emitting particles.

Figure 3:
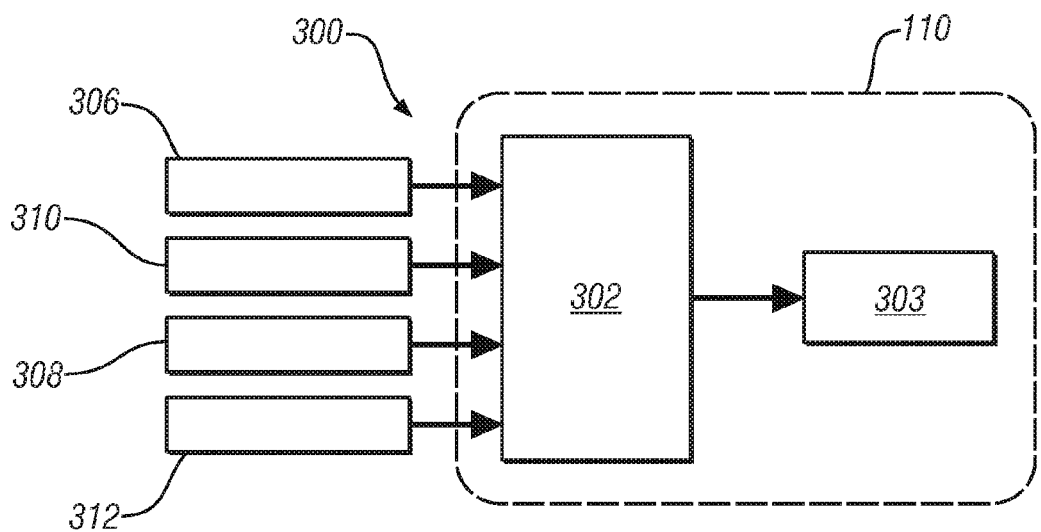
FIG. 3 schematically illustrates an exemplary target tracking system 300 whereby sensor inputs are fused to continuously determine a current location 303 of a remote or target object being tracked, in accordance with the present disclosure.

FIG. 3 shows a schematic diagram of a target tracking system 300, in accordance with the present disclosure. The exemplary vehicle 100 of FIG. 1 includes a passenger vehicle intended for use on highways, although it is understood that the disclosure described herein is applicable on any vehicle or other system seeking to monitor position and trajectory of remote vehicles and other objects. The target tracking system 300 is associated with the EVS system manager 110 architecture and contains various algorithms and calibrations executed at various times. The target tracking system 300 is operable to monitor inputs from various sensors and sources, synthesize pertinent information and inputs, and execute algorithms to control various actuators to achieve control targets, including monitoring the current location of identified potentially threatening vehicles.

FIG. 3 schematically illustrates the exemplary target tracking system 300 whereby sensor inputs are fused to continuously determine the current location 303 of a remote or target object being tracked. Inputs related to target objects in an environment around the vehicle are monitored by a data fusion module 302. The data fusion module 302 analyzes, filters, or prioritizes the inputs relative to the reliability of the various inputs, and the prioritized or weighted inputs are summed to determine the current location of the target object.

As described in FIG. 3, the data fusion module 302 is useful to integrate input from various sensing devices and generate a fused track of the target object to determine the current location of the target object. The fused track includes a data estimate of relative location and trajectory of the target object relative to the vehicle. This data estimate, based upon range sensors 306 including radar, lidar and other range finding sensor inputs is useful, but includes the inaccuracies and imprecision of the sensor devices utilized to create the track. As described above, different sensor inputs can be utilized in unison to improve accuracy of the estimates involved in determining the current location of the target object (e.g., determining the current location of a potentially threatening vehicle).

Vision systems provide an alternate source of sensor input for use in the target tracking system 300. Methods for analyzing visual information are known in the art to include pattern recognition, corner detection, vertical edge detection, vertical object recognition, and other methods. However, it will be appreciated that high-resolution visual representations of the field in front a vehicle refreshing at a high rate necessary to appreciate motion in real-time include a very large amount of information to be analyzed. Real-time analysis of visual information can be prohibitive. A method is disclosed to fuse input from the vision system 308 with range sensors 306 described above to focus vision analysis upon a portion of the visual information most likely to determine the current location of the target object. The vision system 308 can include a camera device having 360 degrees of rotation.

Additional in-vehicle sensors 312 including, but not limited to, infrared and ultrasonic information can be utilized with the data fusion module 302 of the target tracking system 300 to determine the current location 303 of the target object.

Further, vehicle-to-vehicle information 310 can be utilized to determine the current location 303 of the target object when the target object is another vehicle. When the target object is a second vehicle, the second vehicle communicates its current location to the control system (e.g., EVS system manager 110) of a first vehicle. The current location communicated by the second vehicle can include the second vehicle providing GPS coordinates in conjunction with 3D map data to the first vehicle. The vehicle-to-vehicle information 310 can be used alone or can be used in the fusion module 302 with the various sensing devices to generate the fused track of the target object to determine the current location 303 of the target object.

It should further be appreciated that the data fusion module 302 of FIG. 3 can be utilized to continuously monitor the surrounding environment using its range sensors (e.g., radars and lidars), cameras, IR imaging devices and vehicle-to-vehicle communication to take appropriate counter-measurements in order to avoid incidents or situations to develop into a collision by assessing the input from the sensing devices. Additionally, a trajectory fusing process permits determining position of a target object in the XY-coordinate system relative to the vehicle. An exemplary trajectory fusing process is disclosed in U.S. Pat. No. 7,460,951, entitled SYSTEM AND METHOD OF TARGET TRACKING USING SENSOR FUSION, and is incorporated herein by reference. Likewise, object tracks can be utilized for a variety of purposes including adaptive cruise control, wherein the vehicle adjusts speed to maintain a minimum distance from vehicles in the current path, as described above. Another similar system wherein object tracks can be utilized is a collision preparation system (CPS), wherein identified object tracks are analyzed in order to identify a likely impending or imminent collision based upon the track motion relative to the vehicle. A CPS warns the driver of an impending collision and reduces collision severity by automatic braking if a collision is considered to be unavoidable.

All of the mentioned inputs can be utilized by the exemplary EVS system manager 110. Additionally, it will be appreciated that the EVS system manager has access to methods described above related to target tracking to determine the current location of the target object, wherein the target object can be an identified potentially threatening vehicle.

Embodiments envisioned include dynamically registering a graphic onto a driving scene of a vehicle utilizing a substantially transparent windscreen HUD, wherein the graphic identifies a potentially threatening vehicle. Dynamically registering the graphic onto the driving scene of the vehicle requires monitoring data related to an occupant eye location (and/or head location), monitoring a current orientation of the vehicle and monitoring a current location of a target object (e.g., the identified potentially threatening vehicle). With reference to FIGS. 1 and 3, the occupant eye location sensing system 160 includes sensors known in the art to approximate a location of the head of an occupant and further the orientation or gaze location of the eyes of the occupant. An occupant can be an operator of the vehicle or a passenger within the vehicle. Head and eye sensing devices are known in the art and will not be discussed in great detail here. For the purposes of this disclosure, a camera based device is utilized in combination with image recognition software to estimate a three-dimensional head location within the vehicle, able to be coordinated with a vehicle coordinate system, and a direction of occupant's gaze based upon image recognition programming.

The current orientation of the vehicle can be determined by methods known in the art such as, but not limited to, monitoring the GPS device 140 in conjunction with a 3D map database and a digital compass including detailed information relating to a global coordinate received by the GPS device 140 regarding the current location of the vehicle. The current orientation can also be determined by vehicle kinematics including at least vehicle speed and yaw rate, available through sensors monitoring vehicle operation and/or monitoring accelerometer readings.

The current location of the target object can be monitored by analyzing the data obtained by the target tracking system 300 described above in FIG. 3, where one or more sensors are used in conjunction with each other to monitor the current location of the target object. For instance, vehicle sensor systems, including camera system 120 and radar system 125 can fuse collected information to monitor the current location of the target object. Likewise, vehicle-to-vehicle communication can be utilized where the target object is a second vehicle that continuously conveys its current location back to the vehicle (e.g., conveys GPS information).

Based on the occupant eye location, the current orientation of the vehicle and the current location of the target object (e.g., the identified potentially threatening vehicle), an estimated point of intersection between the tracked object (e.g., the identified potentially threatening vehicle) and the operator's eyes can be determined upon the windscreen, thereby enabling graphical images to be dynamically registered to a location upon the windscreen corresponding to the driving scene of the vehicle, such that the occupant of the vehicle may view the identified potentially threatening vehicles and the registered graphical image identifying the potentially threatening vehicles as a single discernable input.

It will be further appreciated that the dynamically registered graphics can be dynamically updated based upon the occupant's gaze location. As will be described in more detail below with specific examples, emphasis to the registered graphic can be enhanced or decreased based on the distance between the occupant's gaze location and the identified potentially threatening vehicle on the driving scene. For instance, as occupant's gaze location from the registered graphic increases, emphasis may be added to the graphic to gain the occupant's attention because it is evident the occupant is looking away from the graphic. However, if the occupant's gaze location from the registered graphic decreases, emphasis may be reduced to the graphic because it is evident the occupant is looking at or near the graphic. Likewise, if the graphic is textual in nature, emphasis may be added to the textual graphic to clarify the text because it is evident the occupant is looking at the graphic and attempting to read the text. Emphasis can include increasing or decreasing illumination of the graphic and/or flashing or pulsating the registered graphic.

Figure 4:
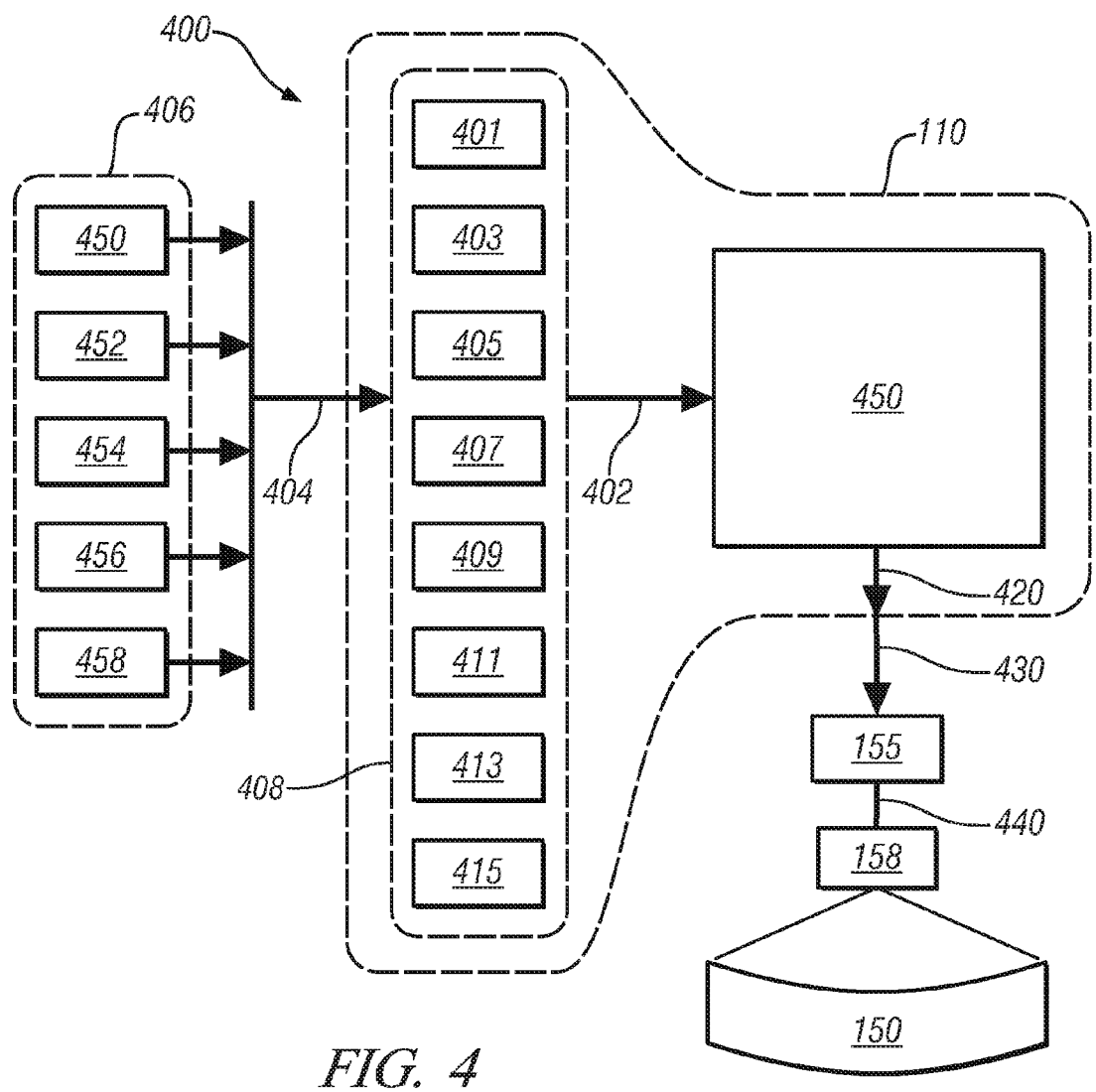
FIG. 4 schematically depicts an exemplary control system 400 to identify and locate potentially threatening vehicles to the vehicle in a vehicular environment relative to the vehicle, in accordance with the present disclosure.

Referring to FIG. 4, a schematic depiction of an exemplary control system 400 to identify and locate potentially threatening vehicles to the vehicle in a vehicular environment relative to the vehicle. A potential threatening vehicle module (PTVM) 450 associated with the EVS system manager 110 analyzes vehicle environment inputs 402 utilized by the PTVM 450 to identify potentially threatening vehicles 420. The vehicle environment input 402 is generated by a vehicular environment module (VEM) 408, wherein the VEM 408 includes a plurality of control schemes to monitor the vehicular environment to identify potentially threatening vehicles 420. The VEM is associated with the EVS system manager 110. The plurality of control schemes include, but are not limited to, a driving pattern scheme 401, a forward vehicle threat scheme 403, an occupant classification scheme 405, a lane wandering scheme 407, a driving variance scheme 409, a vehicle operating state scheme 411, a vehicle classification scheme 413 and a driving characteristic scheme 415. The plurality of control schemes of the VEM 408 to monitor the vehicular environment and generate the vehicle environment inputs 402 utilized by the PTVM 450 to identify potentially threatening vehicles 420 will be discussed in greater detail below.

The plurality of control schemes of the VEM 408 utilizes sensor inputs 404 from a plurality of vehicle sensors 406 to monitor the vehicular environment. It should be appreciated that each of the plurality of vehicle sensors 406 can be utilized alone or in unison with other sensors depending on the application in monitoring the vehicular environment to generate the vehicle environment inputs 402 utilized by the PTVM 450 to identify potentially threatening vehicles 420. The plurality of vehicle sensors 406 can include data from a lidar system 450, data from a radar system 452, data from an IR imaging device 454, vehicle-to-vehicle information 456 and data from a camera system 458 capable of 360 degrees of rotation. However, this disclosure is not limited to these sensors. The vehicle-to-vehicle information 456, also referred to as vehicle-to-vehicle communication, includes utilizing GPS and 3D map data, the wireless communication system 145 (see FIG. 1), the satellite system 180 (see FIG. 1) and the cellular communications tower 190 (see FIG. 1). The plurality of vehicle sensors 406 will be discussed in greater detail below when applicable to a given control scheme of the VEM 408.

Control system 400 further includes the EVS system manager 110 monitoring information from the PTVM 450 and generating display requirements 430 based on the identified potentially threatening vehicles 420 generated by the PTVM 450, EVS graphics system 155 monitoring the display requirements 430 from the EVS system manager 110 and generating graphics commands 440, and a graphics projection system 158 projecting light upon a head-up display 150.

Embodiments envisioned include utilizing the plurality of vehicle sensors 406 in association with the plurality of control schemes of the VEM 408 to monitor a vehicular environment relative to the vehicle. Based on the vehicle environment inputs 402 the PTVM 450 can identify the potentially threatening vehicles 420, wherein the EVS graphics system 155 determines the graphic identifying the potentially threatening vehicle and a location of the graphic is dynamically registered upon the substantially transparent windscreen head-up display corresponding to the driving scene. Dynamically registering the graphic upon the head-up display corresponding to the driving scene is discussed above and will not be discussed in detail herein. The graphics projection system 158 displays the graphic onto the driving scene of the vehicle utilizing the head-up display.

The driving pattern scheme 401 includes analyzing a driving pattern of a vehicular environment vehicle along a roadway. It will be understood that the vehicular environment vehicle includes any vehicle on the driving scene that could eventually be identified as a potentially threatening vehicle. Based on the analyzing, the driving pattern of the vehicular environment vehicle can be determined to indicate adverse driving. The vehicular environment vehicle is identified as a potentially threatening if the driving pattern of the vehicular environment vehicle is determined to indicate adverse driving. It will be appreciated that analyzing the driving pattern of the vehicular environment vehicle along the roadway can include analyzing attentiveness of roadway hazards of the vehicular environment vehicle and determining the driving pattern to indicate adverse driving if the vehicular environment vehicle is determined to be inattentive of the roadway hazards. For instance, a novice driver may be identified as a potentially threatening vehicle if the novice driver is not stopping at stop signs or failing to heed yield hazards. Analyzing the driving pattern can further include analyzing the reaction time of the vehicular environment vehicle and determining the driving pattern to indicate adverse driving when it is determined that the vehicular environment vehicle has a slow reaction time. For instance, monitored sensor inputs 404 can be utilized to show that another vehicle slowly reacts to stop lights or slowly reacts to congested traffic. Analyzing the driving pattern can further include analyzing the space cushion between the vehicular environment vehicle and vehicle traffic. The driving pattern of the vehicular environment vehicle can indicate adverse driving when the space cushion is less that a space cushion threshold. For instance, a cab driver riding the bumper of vehicles it is behind could be identified as a potentially threatening vehicle. Driving patterns that indicate adverse driving are not limited to the embodiments and examples above and can further include any driving pattern that possesses careless, reckless, or otherwise poor driving patterns. For instance, jerky maneuvers, turning at a high rate of speed, braking abruptly and not adjusting speed in poor road conditions can all be driving patterns indicative of adverse driving. It is further appreciated that the driving pattern scheme 401 can utilize vehicle-to-vehicle information 456 as a sensor input, wherein the vehicle-to-vehicle information transmits the driving pattern of a second vehicle to the vehicle and the vehicle can determine if the transmitted driving pattern indicates adverse driving. If the driving pattern of the second vehicle indicates adverse driving, the second vehicle can be identified as a potentially threatening vehicle. Additionally, the driving pattern of vehicular environment vehicles can be analyzed utilizing the data from the lidar system 430, the data from the radar system 452, the data from the IR imaging device 454 and image data from the camera system 458 alone or used in conjunction with one another. As will be discussed in greater detail below, the graphic identifying the potentially threatening vehicle can include utilizing a highlighted box encompassing the potentially threatening vehicle.

It should further be appreciated that this disclosure is not limited to identifying vehicular environment vehicles as potential threats and can include monitoring pedestrians and identifying pedestrians as potential threats. For instance, a jogger could be identified as a potential threat and a dynamically registered graphic can be utilized to identify the jogger. Likewise, roadside children playing can be identified as potential threats utilizing any of the methods discussed herein.

The forward vehicle threat scheme 403 includes monitoring vehicle-to-vehicle information 456 to monitor the vehicle environment relative to the vehicle. The vehicle-to-vehicle information includes conveying a request for a potentially threatening vehicle forward along a roadway from the vehicle to a second vehicle. The second vehicle can transfer the identification of a potentially threatening vehicle from the second vehicle to the first vehicle based on the second vehicle identifying the potentially threatening vehicle. The second vehicle can utilize vehicle sensors of the second vehicle or any other means to detect the potentially threatening vehicle.

It is understood that the second vehicle is forward along a roadway where only vehicle-to-vehicle information 456 may be available because the other plurality of sensors 406 may not be effective over long distances. However, even if other vehicle sensors are available, the vehicle-to-vehicle information 456 can be preferred depending upon the application.

The occupant classification scheme 405 includes utilizing vehicle-to-vehicle information 456 to convey a request for a classification of an operator of a second vehicle from the vehicle to the second vehicle. The classification of the operator of the second vehicle can be transferred from the second vehicle to the vehicle. The classification of the operator of the second vehicle is compared to an operator classification threshold, wherein a potentially threatening vehicle is identified when the classification of the operator violates the operator classification threshold. The request for the classification of the operator can include a request for the operator's age. For instance, if the age of the operator of the second vehicle is a teenager and the threshold is selected to identify any driver under 25 and over 60 as potentially threatening, the second vehicle having the teenage operator will be identified as a potentially threatening vehicle because the teenager violates the classification threshold. Likewise, the request for the classification of the operator can include a request for how many times the operator has violated driving codes. The classification threshold can be selected to include any code violations deemed as serious, such as a single reckless driving offense, to violate the classification threshold. In another non-limiting example, the classification threshold can be selected to include four speeding tickets in the last two years to violate the classification threshold. In addition to the highlighted box to encompass the potentially threatening vehicle for identifying the potentially threatening vehicle, a textual graphic can be utilized to describe the potentially threatening vehicle. For instance, the textual graphic can describe the classification of the operator of the second vehicle such as the operator's age or the number of driving code violations the operator has accumulated.

The lane wandering scheme 407 includes monitoring lane wandering of a vehicular environment vehicle utilizing one of or any combination of the plurality of vehicle sensors 406. Monitoring lane wandering of the vehicular environment vehicle includes monitoring a lane of travel of the vehicular environment vehicle traveling along a roadway and determining the number of times the vehicular environment vehicle deviates from the monitored lane of travel within a time span. The number of times the vehicular environment vehicle deviates from the monitored lane of travel within the time span is compared to a wandering threshold. A potentially threatening vehicle is identified when the number of times the vehicular environment vehicle deviates from the monitored lane of travel within the time span exceeds the wandering threshold. For instance, if a motorist traveling along the roadway deviates from the lane of travel four times in a minute, the motorist can be identified as a potentially threatening vehicle. It should be appreciated that the wandering threshold should be sufficiently high enough to reduce false identification of potentially threatening vehicles and sufficiently low enough to detect and identify potentially threatening vehicles.

The driving variance scheme 409 includes monitoring driving variance of a vehicular environment vehicle. The monitored driving variance is compared to a driving variance threshold and a potentially threatening vehicle can be identified when the monitored driving variance violates the driving variance threshold. Driving variance can include variances in acceleration, deceleration and velocity. The driving variance threshold can include an acceleration variance threshold, a deceleration variance threshold and a velocity variance threshold. For instance, one or any combination of the plurality of vehicle sensors 406 can determine that a sports car is accelerating at a high rate of speed. If the rate of speed is determined to be higher than the acceleration threshold, the sports car may be identified as a potentially threatening vehicle. In another non-limiting example, if a truck slowing down at a high rate of speed violates the deceleration threshold, the truck may be identified as a potentially threatening vehicle. In another non-limiting example, if variances in the speed of a SUV, for instance traveling at 35 mph for a couple seconds and then traveling at 50 mph, violate the velocity variance threshold, the SUV may be identified as a potentially threatening vehicle.

The vehicle operating state scheme 411 includes monitoring a current operating state of a vehicular environment vehicle relative to the vehicle and comparing the current operating state of the vehicular environment vehicle to an operating state threshold. A potentially threatening vehicle can be identified when the current operating state violates the operating state threshold. The current operating state can correspond to a current speed of the vehicular environment vehicle, whereas the operating state threshold can be a posted speed limit on the roadway. For instance, if the current monitored speed of the vehicular environment vehicle violates the posted speed limit, the vehicular environment vehicle can be identified as a potentially threatening vehicle. The current operating state can correspond to a current carrying load of the vehicular environment vehicle, whereas the operating state threshold can be a carrying load capacity corresponding to the vehicular environment vehicle being monitored. For instance, if the vehicular environment vehicle is carrying a load that exceeds the carrying load capacity, the vehicular environment vehicle can be identified as a potentially threatening vehicle. Data from the lidar system 430, data from the radar system 452, data from the IR imaging device 454, the vehicle-to-vehicle information 456 and image data from the camera system 458 could all be used alone are fused together in any combination to monitor the current operating state of the vehicular environment vehicle.

The vehicle classification scheme 413 includes monitoring a vehicle classification of a vehicular environment vehicle and comparing the vehicle classification to a vehicle classification threat. The vehicular environment vehicle can be identified as a potentially threatening vehicle when the vehicle classification matches the vehicle classification threat. For instance, the vehicle classification threat can include all motorcycles. If the monitored vehicle classification is a motor cycle, then the motorcycle can be identified as a potentially threatening vehicle. In another non-limiting example, the vehicle classification threat can include all vehicles made prior to 1980, then any vehicle made prior to 1980 can be identified as a potentially threatening vehicle. Image data from the camera system 458 can be utilized to determine the classification of the vehicular environment vehicle along a roadway. Likewise, data from the IR imaging device 454 can be utilized to determine the classification of the vehicular environment vehicle along the roadway.

The driving characteristic scheme 415 includes monitoring driving characteristics of a vehicular environment vehicle relative to the vehicle, monitoring vehicular environment conditions and comparing the monitored driving characteristics and the monitored vehicular environment conditions. A potentially threatening vehicle can be identified based upon the comparing. It will be understood that driving characteristics that include aggressive maneuvers, un-maneuverable vehicles and driving characteristics indicative of novice drivers can all be driving characteristics that could identify a potentially threatening vehicle. Vehicular environment conditions can include monitoring roadway conditions such as precipitation, ice and gravel. Vehicular environment conditions can include adverse weather conditions such as fog, rain or snow. Vehicular environment conditions can additionally include the concentration of vehicle traffic or if the time of day is daylight or night time. It is appreciated that utilizing GPS and 3D mapping can determine the location of the vehicle and wireless communications can be utilized in association with the determined location of the vehicle to determine if the vehicle is currently in adverse weather conditions or if it is daylight or nighttime. Additionally, image data from the camera system 458 and data from the IR imaging device 454 can determine adverse weather conditions such as detecting snow or fog. In a non-limiting example, if the monitored driving characteristics determine a rear-wheel sports car on the side of the road and the monitored vehicular environment conditions indicate there is two feet of snow on the ground, the rear-wheel sports car can be identified as potentially threatening because it may be un-maneuverable. In another non-limiting example, monitored driving characteristics that indicate aggressive maneuvers could be enough to satisfy the identification of a potentially threatening vehicle independent of the monitored vehicular environment conditions. However, if the monitored vehicular environment conditions also indicate it is raining and night time, the degree of potential threat could be increased. In scenarios where the degree of potential threat is high, the graphic identifying the potentially threatening vehicle can include augmenting the color of the graphic to a bright red to indicate an extreme threat.

It is understood that an identified potentially threatening vehicle traveling five miles per hour above the speed limit may not be as threatening as an identified potentially threatening vehicle traveling 30 miles per hour above the speed limit. Therefore the degree of threat possessed by the identified potentially threatening vehicle can be determined. It is further understood that an identified potentially threatening vehicle traveling away at an increasing speed from the vehicle may not be as threatening to the vehicle as an identified potentially threatening vehicle traveling towards the vehicle. Hence, the degree of threat can vary depending upon the distance between the vehicle and the potentially threatening vehicle. The dynamically registered graphic identifying the potentially threatening vehicle can be dynamically augmented based upon the degree of threat and the distance between the vehicle and the identified potentially threatening vehicle. Range data including data from the lidar and radar systems 450, 452, respectively, can be utilized to continuously monitor identified potentially threatening vehicles and further determine the degree of threat as increasing or decreasing. Therefore, a pick-up truck identified as potentially threatening due to lane wandering traveling in the same direction, and at an increasing distance ahead of the vehicle, may become less threatening as the pick-up truck increases its distance from the vehicle. However, if the distance becomes decreasing between the vehicle and the pick-up truck that is lane wandering, the degree of threat may increase. The registered graphic identifying the potentially threatening vehicle can therefore be dynamically augmented based on the degree of threat and the distance between the vehicle and the identified potentially threatening vehicle. For instance, the registered graphic may be dynamically augmented from a green color to a red color if the distance between the lane-wandering pick-up truck and the vehicle decreases. Likewise, the registered graphic may be dynamically augmented to flash or pulsate.

As aforementioned, dynamically registered highlighted graphics outlining the identified potentially threatening vehicle can be utilized for identification and dynamically registered textual message graphics can be utilized to describe the potentially threatening vehicle. Referring to FIG. 5, a driving scene 500 is illustrated through a substantially transparent windscreen head-up display 150 of a vehicle. A sports car 502 and an SUV 504 can be viewed through the windscreen head-up display 150. The sports car 502 is travelling in an opposite direction as the vehicle and the SUV 504 is travelling in the same direction as the vehicle. Utilizing methods described above, highlighted box graphics 520 and 540 are dynamically registered upon the substantially transparent windscreen head-up display 150 encompassing and outlining the sports car 502 and the SUV 504, respectively. It is appreciated that the sports car 502 and the SUV 504 are both identified as potentially threatening vehicles utilizing methods described above. A dynamically registered textual message graphic 522 is utilized to describe the potential threat as lane wandering and that the sports car 502 is a quarter-mile away. It is understood that the graphics 520 and 522 can be dynamically augmented based on the degree of threat and the distance between the vehicle and the sports car 502. Thus, the highlighted box graphic 520 can augment color to change from a green to red as the distance between the vehicle and the sports car 502 decreases. It is further appreciated that the textual message graphic 522 can be configured to pulsate due to lane-wandering having a high degree of threat as the sports car 502 approaches the vehicle. A dynamically registered textual message graphic 542 is utilized to describe the SUV 504 as a potential threat due to deceleration of the SUV 504 violating a deceleration threshold. It is understood that graphics 540 and 542 can be dynamically augmented based on the degree of threat and the distance between the vehicle and the SUV 504. Here, the highlighted box graphic 540 can augment to flash or pulsate as the vehicle approaches the SUV 504.

The above disclosure describes a substantially transparent head-up display capable of full-screen display. It will be appreciated that similar methods can be employed upon windscreens utilizing a substantially full-windscreen display, a partial windscreen display, for example limited to the driver's half of the windscreen, or a display focused or limited to the straight-forward typical center of view of the operator. The disclosure is not limited to windscreens, but can include substantially transparent head-up displays that include side windows or a rear window of a vehicle. Graphics can additionally be projected upon pillars of the vehicle. Many embodiments of displays are envisioned, and the disclosure is not intended to be limited to the particular exemplary embodiments described herein.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method to dynamically register a graphic identifying a potentially threatening vehicle onto a driving scene of a vehicle utilizing a substantially transparent windscreen head up display, comprising:
   monitoring a vehicular environment;
   identifying the potentially threatening vehicle based on the monitored vehicular environment;

determining the graphic identifying the potentially threatening vehicle;
dynamically registering a location of the graphic upon the substantially transparent windscreen head up display corresponding to the driving scene of the vehicle;
displaying the graphic upon the substantially transparent windscreen head up display; and
wherein the substantially transparent windscreen head up display comprises one of light emitting particles or microstructures over a predefined region of the windscreen permitting luminescent display while permitting vision therethrough.

2. The method of claim 1 further comprising monitoring an occupant eye location, monitoring a current orientation of the vehicle and monitoring a current location of the potentially threatening vehicle; and
wherein dynamically registering the location of the graphic upon the substantially transparent windscreen head up display corresponding to the driving scene of the vehicle is based on the occupant eye location, the current orientation of the vehicle and the current location of the identified potentially threatening vehicle.

3. The method of claim 2 further comprising monitoring an operator gaze location;
wherein determining the graphic identifying the potentially threatening vehicle comprises increasing an emphasis to the graphic as a distance between the operator gaze location and the current location of the identified potentially threatening vehicle increases; and
wherein determining the graphic identifying the potentially threatening vehicle further comprises decreasing the emphasis to the graphic as the distance between the operator gaze location and the current location of the identified potentially threatening vehicle decreases.

4. The method of claim 1 wherein determining the graphic identifying the potentially threatening vehicle comprises utilizing a highlighted box encompassing the potentially threatening vehicle.

5. The method of claim 1 further comprising monitoring a vehicle-to-vehicle communication; and
wherein monitoring the vehicle environment is based upon the vehicle-to-vehicle communication.

6. The method of claim 5 wherein monitoring the vehicle environment based upon the vehicle-to-vehicle communication comprises:
analyzing a driving pattern of a second vehicle transmitted within the vehicle-to-vehicle communication;
determining the driving pattern of the second vehicle to indicate adverse driving behavior; and
identifying the second vehicle as a potential threat based on the indicated adverse driving behavior.

7. The method of claim 5 wherein monitoring the vehicle environment based upon the vehicle-to-vehicle communication comprises:
conveying a request for potentially threatening vehicles forward along a roadway from the vehicle to a second vehicle forward along the roadway; and
transferring an identification of potentially threatening vehicles from the second vehicle to the vehicle based on the second vehicle identifying the potentially threatening vehicle utilizing vehicle sensors of the second vehicle.

8. The method of claim 5 wherein monitoring the vehicle environment based upon the vehicle-to-vehicle communication comprises:
conveying a request for a classification of an operator of a second vehicle from the vehicle to the second vehicle;
transferring the classification of the operator of the second vehicle from the second vehicle to the vehicle;
comparing the classification of the operator of the second vehicle to an operator classification threshold; and
wherein identifying the potentially threatening vehicle based on the monitored vehicular environment comprises identifying the second vehicle as potentially threatening if the classification of the operator violates the operator classification threshold.

9. The method of claim 1 wherein monitoring the vehicular environment comprises
monitoring a lane of travel of a vehicular environment vehicle traveling along a roadway;
determining the number of times the vehicular environment vehicle deviates from the monitored lane of travel within a time span;
comparing the number of times the vehicular environment vehicle deviates from the monitored lane of travel within the time span to a threshold;
wherein identifying the potentially threatening vehicle based on the monitored vehicular environment comprises identifying the vehicular environment vehicle as potentially threatening when the number of times the vehicular environment vehicle deviates from the monitored lane of travel within the time span exceeds the threshold.

10. The method of claim 1 wherein monitoring the vehicular environment comprises:
monitoring driving variance of a vehicular environment vehicle;
comparing the driving variance to a driving variance threshold; and
wherein identifying the potentially threatening vehicle based on the monitored vehicular environment comprises identifying the vehicular environment vehicle as potentially threatening when the monitored driving variance violates the driving variance threshold.

11. The method of claim 1 wherein monitoring the vehicular environment comprises:
monitoring a current operating state of a vehicular environment vehicle relative to the vehicle;
comparing the current operating state of the vehicular environment vehicle to an operating state threshold; and
wherein identifying the potentially threatening vehicle based on the monitored vehicular environment comprises identifying the vehicular environment vehicle as potentially threatening when the monitored current operating state violates the operating state threshold.

12. The method of claim 1 wherein monitoring the vehicular environment comprises:
monitoring a vehicle classification of a vehicular environment vehicle;
comparing the vehicle classification to a vehicle classification threat; and
wherein identifying the potentially threatening vehicle based on the monitored vehicular environment comprises identifying the vehicular environment vehicle as potentially threatening when the vehicular environment vehicle matches the vehicle classification threat.

13. The method of claim 1 wherein monitoring the vehicular environment comprises:
monitoring driving characteristics of a vehicular environment vehicle relative to the vehicle;
monitoring vehicular environment conditions;
comparing the driving characteristics of the vehicular environment vehicle and the vehicular environment conditions; and wherein identifying the potentially threatening vehicle based on the monitored vehicular environment comprises identifying the vehicular environment vehicle as potentially threatening based on the comparing.

14. Method to dynamically register a highlighted outline graphic identifying a potentially threatening vehicle onto a driving scene of a vehicle utilizing a substantially transparent windscreen head up display, comprising:
analyzing a driving pattern of a vehicular environment vehicle along a roadway;
determining the driving pattern of the vehicular environment vehicle to indicate adverse driving based on the analyzing;
identifying the potentially threatening vehicle based on the determined driving pattern of the vehicular environment vehicle to indicate adverse driving;
utilizing the highlighted outline graphic identifying the potentially threatening vehicle;
monitoring an occupant eye location including occupant gaze location, monitoring a current orientation of the vehicle and monitoring a current location of the identified potentially threatening vehicle;
dynamically registering a location of the highlighted outline graphic upon the substantially transparent windscreen head up display corresponding to the driving scene of the vehicle and based upon the occupant eye location including occupant gaze location, the current orientation of the vehicle and the current location of the identified potentially threatening vehicle;
displaying the highlighted outline graphic upon the substantially transparent windscreen head up display; and
wherein the substantially transparent windscreen head up display comprises one of light emitting particles or microstructures over a predefined region of the windscreen permitting luminescent display while permitting vision therethrough.

15. The method of claim 14 further comprising:
providing a textual message graphic describing the potentially threatening vehicle;
dynamically registering a location of the textual message graphic describing the potentially threatening vehicle upon the substantially transparent windscreen head up display corresponding to the driving scene of the vehicle and based upon the occupant eye location including occupant gaze location, the current orientation of the vehicle and the current location of the identified potentially threatening vehicle; and
displaying the textual message graphic describing the potentially threatening vehicle upon the substantially transparent windscreen head up display.

16. The method of claim 15 wherein providing the textual message graphic describing the potentially threatening vehicle comprises increasing an emphasis to the textual message graphic as a distance between the operator gaze location and the current orientation of the identified potentially threatening vehicle decreases, and decreasing the emphasis to the textual message graphic as the distance between the operator gaze location and the current orientation of the identified potentially threatening vehicle increases.

17. The method of claim 14 further comprising:
determining a degree of threat for the identified potentially threatening vehicle;
monitoring a distance between the vehicle and the potentially threatening vehicle; and
wherein utilizing the highlighted outline graphic identifying the potentially threatening vehicle comprises dynamically augmenting the highlighted outline graphic based on the degree of threat and the distance between the vehicle and the identified potentially threatening vehicle.

18. The method of claim 14 wherein analyzing the driving pattern of the vehicular environment vehicle along the roadway comprises analyzing attentiveness of the vehicular environment vehicle to roadway hazards; and
wherein determining the driving pattern of the vehicular environment vehicle to indicate adverse driving based on the analyzing comprises determining the vehicular environment vehicle to indicate adverse driving based on the vehicular environment vehicle being inattentive to the roadway hazards.

19. The method of claim 14 wherein analyzing the driving pattern of the vehicular environment vehicle along the roadway comprises analyzing a reaction time of the vehicular environment vehicle to vehicular traffic conditions; and
wherein determining the driving pattern of the vehicular environment vehicle to indicate adverse driving based on the analyzing comprises determining the vehicular environment vehicle to indicate adverse driving based on a slow reaction time of the vehicular environment vehicle to the vehicular traffic conditions.

20. The method of claim 14 wherein analyzing the driving pattern of the vehicular environment vehicle along the roadway comprises analyzing a space cushion between the vehicular environment vehicle and vehicle traffic; and
wherein determining the driving pattern of the vehicular environment vehicle to indicate adverse driving based on the analyzing comprises determining the vehicular environment vehicle to indicate adverse driving when the space cushion is less than a space cushion threshold.

* * * * *